US011848838B2

(12) United States Patent
Sesha

(10) Patent No.: US 11,848,838 B2
(45) Date of Patent: Dec. 19, 2023

(54) COMMUNICATING NODE EVENTS IN NETWORK CONFIGURATION

(71) Applicant: HEWLETT PACKARD ENTERPRISE DEVELOPMENT LP, Houston, TX (US)

(72) Inventor: Madhusoodhana Chari Sesha, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/665,096

(22) Filed: Feb. 4, 2022

(65) Prior Publication Data
US 2022/0417120 A1  Dec. 29, 2022

(30) Foreign Application Priority Data

Jun. 24, 2021  (IN) .............................. 202141028351

(51) Int. Cl.
*H04L 43/06* (2022.01)
*H04L 67/10* (2022.01)
*H04L 41/069* (2022.01)

(52) U.S. Cl.
CPC ............ *H04L 43/06* (2013.01); *H04L 41/069* (2013.01); *H04L 67/10* (2013.01)

(58) Field of Classification Search
CPC ........ H04L 43/06; H04L 41/069; H04L 67/10
USPC ........................................................ 709/223
See application file for complete search history.

(56) References Cited

U.S. PATENT DOCUMENTS

| 10,491,459 | B1* | 11/2019 | Andreas | H04W 24/08 |
| 10,666,323 | B1* | 5/2020 | Vannucci | H04B 3/32 |
| 10,693,741 | B2* | 6/2020 | Niwa | G06F 9/46 |
| 10,931,692 | B1* | 2/2021 | Mota | H04L 63/1425 |
| 11,101,884 | B1* | 8/2021 | Campbell | H04Q 11/0066 |
| 11,201,890 | B1* | 12/2021 | Coull | H04L 63/1416 |
| 11,296,953 | B1* | 4/2022 | Ponnuswamy | H04L 43/16 |
| 11,323,312 | B1* | 5/2022 | Banka | H04L 43/10 |
| 11,516,086 | B1* | 11/2022 | Cherian | H04L 41/12 |
| 11,601,336 | B2* | 3/2023 | Wen | H04L 45/08 |
| 11,601,434 | B1* | 3/2023 | Hornsby | H04L 63/0236 |
| 2016/0080502 | A1* | 3/2016 | Yadav | H04L 43/0876 709/227 |

(Continued)

FOREIGN PATENT DOCUMENTS

JP  2016163352 A  *  9/2016  ............... G05B 1/01

OTHER PUBLICATIONS

US 11,500,371 B2, 11/2022, Celia (withdrawn)*

(Continued)

*Primary Examiner* — Melvin H Pollack
(74) *Attorney, Agent, or Firm* — Hewlett Packard Enterprise Patent Department

(57) ABSTRACT

An example method includes recording, by a node out of a plurality of nodes, occurrence of one or more baseline node events, generating a statistical data corresponding to a recorded occurrence of the one or more baseline node events over a pre-determined period, comparing one or more subsequent node events with the statistical data, and communicating data corresponding to the one or more subsequent node events to the central control device, in response to determining that the one or more subsequent node events satisfy the event deviation threshold.

20 Claims, 7 Drawing Sheets

(56) References Cited

U.S. PATENT DOCUMENTS

| | | | | |
|---|---|---|---|---|
| 2016/0352766 | A1* | 12/2016 | Flacher | H04L 12/28 |
| 2017/0124830 | A1* | 5/2017 | Fadell | G08B 19/00 |
| 2017/0277582 | A1* | 9/2017 | Chen | H04L 43/045 |
| 2018/0167259 | A1* | 6/2018 | Kurahashi | G06F 11/34 |
| 2018/0241762 | A1* | 8/2018 | Savalle | G06N 3/006 |
| 2019/0306011 | A1* | 10/2019 | Fenoglio | H04L 41/069 |
| 2019/0347125 | A1* | 11/2019 | Sankaran | G06F 9/30189 |
| 2020/0042857 | A1* | 2/2020 | Fang | G06N 3/08 |
| 2020/0092172 | A1* | 3/2020 | Kumaran | H04B 17/336 |
| 2020/0143446 | A1* | 5/2020 | Zhu | G06Q 30/0201 |
| 2020/0162503 | A1* | 5/2020 | Shurtleff | H04L 41/0883 |
| 2020/0177485 | A1* | 6/2020 | Shurtleff | H04L 67/12 |
| 2020/0285950 | A1* | 9/2020 | Baum | G06F 8/41 |
| 2020/0305232 | A1* | 9/2020 | Miao | H04L 5/0053 |
| 2020/0309827 | A1* | 10/2020 | Sharon | H02J 3/00 |
| 2020/0394499 | A1* | 12/2020 | Yao | G06N 3/0454 |
| 2021/0021503 | A1* | 1/2021 | Kfir | H04L 43/028 |
| 2021/0067549 | A1* | 3/2021 | Chen | H04L 63/1425 |
| 2021/0081717 | A1* | 3/2021 | Creed | G06N 5/022 |
| 2021/0152526 | A1* | 5/2021 | Kohout | H04L 41/12 |
| 2021/0194815 | A1* | 6/2021 | Barton | H04L 43/20 |
| 2021/0211887 | A1* | 7/2021 | Jones | H04W 28/06 |
| 2021/0279602 | A1* | 9/2021 | Latapie | G06N 5/025 |
| 2021/0279615 | A1* | 9/2021 | Latapie | G06N 5/003 |
| 2021/0304061 | A1* | 9/2021 | Kolar | G06F 11/3006 |
| 2021/0326389 | A1* | 10/2021 | Sankar | G06N 20/10 |
| 2021/0390423 | A1* | 12/2021 | Latapie | G06N 5/022 |
| 2022/0070699 | A1* | 3/2022 | Thiyagarajan | H04W 24/04 |
| 2022/0083404 | A1* | 3/2022 | Kumar | G06F 9/542 |
| 2022/0129749 | A1* | 4/2022 | Moritz | G06N 3/045 |
| 2022/0224464 | A1* | 7/2022 | Rakib | H04L 5/0037 |
| 2022/0247643 | A1* | 8/2022 | Dechene | H04L 41/0843 |
| 2022/0279552 | A1* | 9/2022 | Teyeb | H04W 72/1273 |
| 2022/0294529 | A1* | 9/2022 | Janulewicz | H04L 41/16 |
| 2022/0405302 | A1* | 12/2022 | Grunwald | G06F 16/9024 |
| 2023/0013006 | A1* | 1/2023 | Jacob | H04L 43/20 |

OTHER PUBLICATIONS

Gigamon, "GigaVUE HC Series," Retrieved Jul. 13, 2023, https://www.gigamon.com/content/dam/resource-library/english/data-sheet/ds-gigavue-hc-series.pdf.

Moore, S., "Gartner Top 10 Data and Analytics Trends for 2019," Nov. 5, 2019, https://www.gartner.com/smarterwithgartner/gartner-top-10-data-analytics-trends.

NEO4J, "Network Management—Introduction," Retrieved online Jul. 12, 2023, https://guides.neo4j.com/sandbox/network-management/index.html.

Enterprise Management Associates, Inc., "How Graph Databases Solve Problems in Network & Data Center Management: a Close Look at Two Deployments," Oct. 2013, https://neo4j.com/use-cases/network-and-it-operations/.

NEO4J, "HP," Retrieved online Jul. 12, 2023; https://neo4j.com/users/hp/.

* cited by examiner

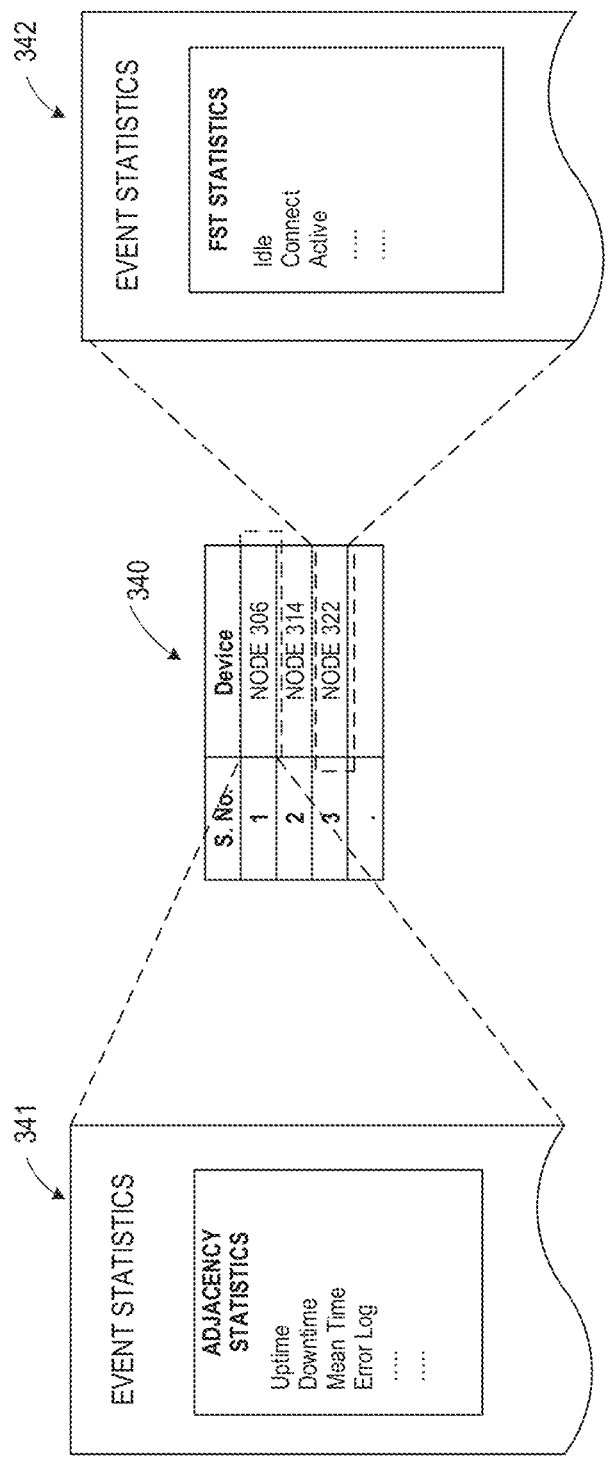

COMMUNICATING NODE EVENTS IN NETWORK CONFIGURATION

BACKGROUND

In computer networks, communication between nodes in a network, or across multiple networks, may be based on routing of data packets between the nodes. The routing may involve selecting a path from one node to another. The path may involve multiple intermediate nodes. Intermediate nodes may receive data packets and determine the intended destination of the received data packets. Based on this determination, an intermediate node may forward the data packets to the next intermediate node or a destination node. Network nodes may use various interior gateway and exterior gateway protocols to exchange routing information. Routing decisions with regard to selecting a path for sending data packets may be made based on locally stored information on a node.

BRIEF DESCRIPTION OF THE DRAWINGS

The present disclosure, in accordance with one or more examples, may be described in detail with reference to the following figures. The figures may be provided for purposes of illustration only and merely depict typical examples, wherein:

FIG. 3B illustrates a schematic view of example event statistics, in accordance with the present subject matter:

Figure 1:
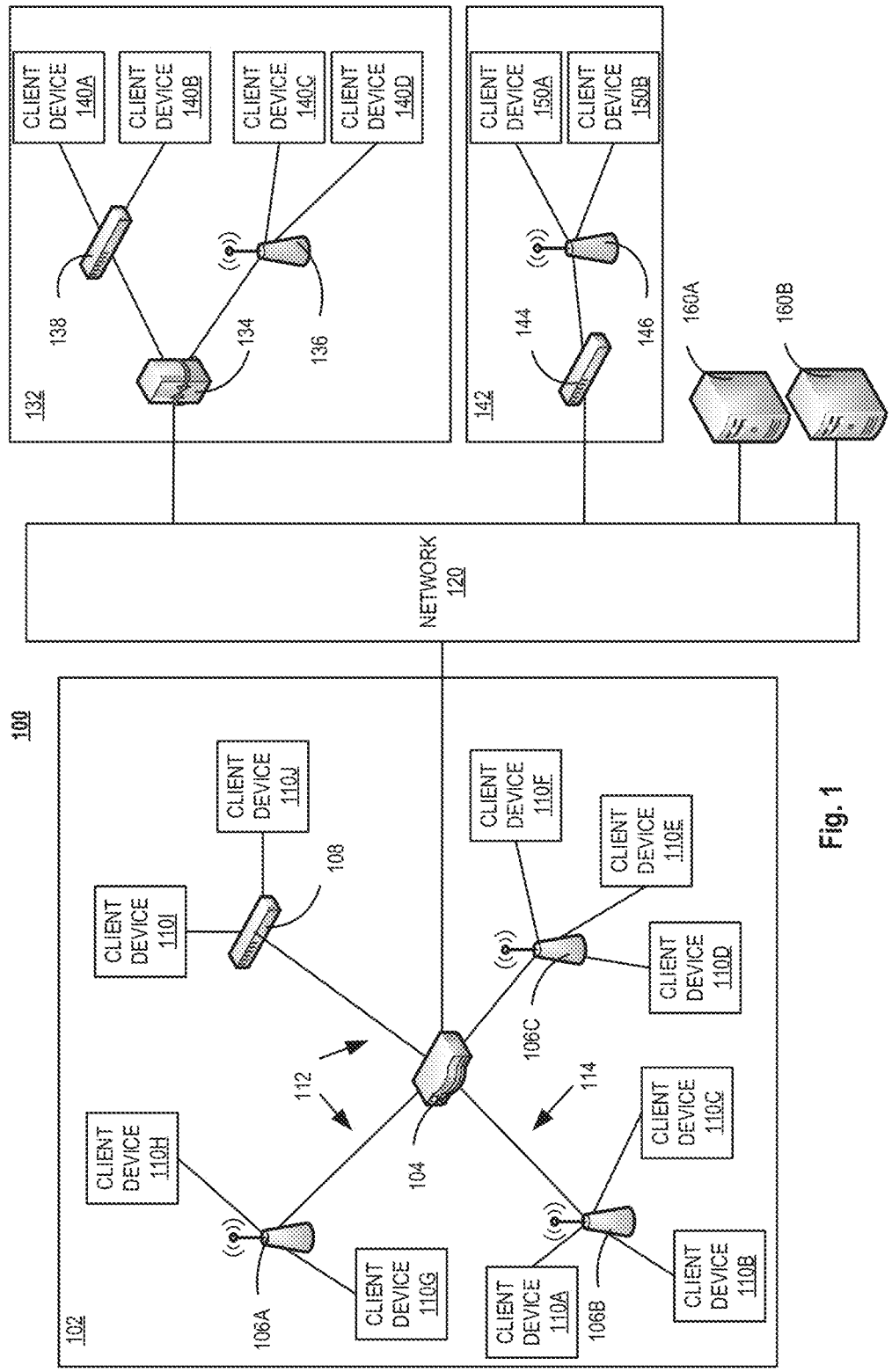
FIG. 1 illustrates an example network configuration that may be implemented for an organization, in accordance with the present subject matter.

The figures may be not exhaustive and do not limit the present disclosure to the precise form disclosed.

DETAILED DESCRIPTION

A node in a network may be any physical device capable of sending, receiving, or forwarding data (e.g., data packets). A node may send data to another node in a network or across multiple networks. The node may send the data across a path that may include one or more intermediate nodes (e.g., routers). The node may send a data packet to an intermediate node with address information identifying a destination node for the data packet. The intermediate node may use information stored locally to determine where to send the data. The locally stored information may include paths and addresses of nodes that may be directly accessible by an intermediate node.

In general, nodes may have limited views of a network and, therefore, locally stored information at a node may not be sufficient to determine an efficient path for delivering a data packet. Sending data between nodes may involve multiple intermediate nodes, and the path that the data takes may rely on the locally stored information of the multiple intermediate nodes. The nodes may use protocols, such as interior gateway protocols and/or exterior gateway protocols, for determining a shortest path to another node. The protocols may enable a node to discover other neighbor nodes on the network. For example, a node may send a message to a neighbor node at a regular interval to determine their availability. In some scenarios, an intermediate node may fail, become unstable or unavailable, and other intermediate nodes in the path may not become aware of the failure or instability/unavailability. In such scenarios, the path may be dynamically updated due to a node going down. In some scenarios, an updated path may require data to travel along longer paths. Some network paths may experience a network churn due to an increase in data traffic. Network churn may disrupt network performance. For example, network churn may cause certain applications to jitter. Whereas, some high-performance computing workloads may experience latency due to delivering data through an inefficient (e.g., longer) path. Hence, identification of network health conditions such as deficiencies, fault localization, failure detection, etc. may be critical.

Generally, nodes in a network may collect real-time data corresponding to the health of the network. The collected data may be sent to a central control for storage and analysis. From the collected data, a central control may perform management and/or control operations. Some networks may include thousands of nodes, and central control may be swamped with large volumes of data received from various nodes. Moreover, some networks may be subjected to frequent changes with addition, removal, failure of devices, or similar events that may impact data transfer. The central control may not be able to effectively handle such large volumes of data and frequent network changes. Hence, identification of network health conditions may be a challenge for monitoring the network. Thus, it may be desirable to address the aforementioned shortcomings.

Accordingly, the present subject matter discloses monitoring of a network using device telemetry. In some examples, device telemetry may include recording event data at the device level and communicating intelligent data to a central service. The device telemetry may be used for various purposes, such as optimizing routing schemes to network entities (e.g., nodes) in the network, etc. In various examples, a node may maintain local telemetry information. The local telemetry information may correspond to various node events, for example, handshake information between nodes, finite state information of protocols, or system resource usage information associated with a node. The local telemetry information may be used to determine various event statistics. Over a pre-determined period, the node may record various baseline node events to generate baseline information for various categories of node events. Subsequently, one or more node events may be compared with the event statistics, such as baseline information.

In some examples, nodes may determine a deviation of node events from the baseline information and may log event errors when a threshold value may be crossed by node events. Nodes may communicate the event errors to a central service for rectification of any node level or network level discrepancies. The event errors/event data may be sent at a reduced frequency to the central service thereby reducing network churn. Moreover, event statistics and event data communicated by node is in refined form that requires reduced resources from the central service for analysis and control (when compared to raw data). The central service may determine any potential downtimes and failure events based on historical data (e.g., event statistics) received from nodes. The central service may optimize the network performance to reduce any latency, jitter, or loss of packets, offering an improved network experience to client devices and users. For example, the central service may push a static path to the network configuration, to avoid an intermediate node that may go down based on historical event data. Further, the present subject matter may enable reduction of redundant nodes, ports, or protocols due to effective monitoring and control of network configuration.

In further examples, the central control may receive intelligent event data (i.e., device telemetry) whereby network churn may be reduced on specific network paths. Further, availability and demand of resources related to the central service may be reduced to intelligent event data being sent to the central service. In some examples, the central service may be a cloud computing resource, and costs associated with the transfer, storage, and analysis of intelligent event data may be significantly less.

In various examples, the device telemetry information may be maintained in a graph database at the central service. The graph database may include information related to the nodes of a network, or multiple networks, as well as information associated with the relationships, or connections, between the nodes. Based on the telemetry information in the graph database, a routing scheme may be generated. The routing scheme may include routing information between nodes. Based on the routing scheme, routing configurations may be generated for the nodes and provided/pushed to the nodes. The nodes may deliver, and forward data based on their respective routing configurations. As the routing configurations may be based on intelligent telemetry information across multiple nodes, routing decisions based on the routing configurations may be more efficient than routing decisions made based solely on locally stored information at nodes.

Before describing examples of the disclosed systems and methods in detail, it may be useful to describe an example network installation with which these systems and methods might be implemented in various applications. FIG. 1 illustrates one example of a network configuration 100 that may be implemented for an organization, such as a business, educational institution, governmental entity, healthcare facility, or other organization. This network configuration 100 may be implemented with an organization having multiple users (or multiple client devices 110) and possibly multiple physical or geographical sites 102, 132, 142. The network configuration 100 may include a primary site 102 in communication with a network 120. The network configuration 100 may also include one or more remote sites 132, 142, that may be in communication with the network 120.

The primary site 102 may include a primary network, which may be, for example, an office network, home network, or other network installation. The primary site 102 may be a private network, such as a network that may include security and access controls to restrict access to authorized users of the private network. Authorized users may include, for example, employees of a company at primary site 102, residents of a house, customers at a business, and so on.

In the illustrated example, the primary site 102 may include a controller 104 in communication with the network 120. Controller 104 may provide communication with network 120 for the primary site 102. A controller 104 may be illustrated, though the primary site may include multiple controllers and/or multiple communication points with network 120. In some examples, the controller 104 may communicate with the network 120 through a separate router (not illustrated). The router may forward data packets between the primary site 102 and the remote sites 132, 142. In other examples, the controller 104 may provide router functionality to the devices in the primary site 102.

A controller 104 may be operable to configure and manage network devices, such as at the primary site 102, and may also manage network devices at the remote sites 132, 142. The controller 104 may be operable to configure and/or manage switches, routers, access points, and/or client devices communicatively coupled to a network. The controller 104 may itself be, or provide the functionality of, an access point.

The controller 104 may be in communication with one or more switches 108 and nodes/routers 106A-C. These nodes 160A-C within the primary site may communicate with each other using interior gateway protocols (IGPs). For example, Open Shortest Path First (OSPF) may be one such interior gateway protocol. Switches 108 and routers 106A-C provide network connectivity to various client devices 110A-J. Using a connection to a switch 108 or at least one of the routers 106A-C, a client device 110A-J may access network resources, including other devices on the (primary site 102) network and the network 120.

Examples of client devices may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, smart terminals, dumb terminals, virtual terminals, video game consoles, virtual assistants, Internet of Things (IoT) devices, and the like.

Within the primary site 102, a switch 108 may be included as one example of a point of access to the network, established in primary site 102 for wired client devices 110I-J. Client devices 110I-J may connect to the switch 108 and through the switch 108, may be able to access other devices within the network configuration 100. The client devices 110I-J may also be able to access the network 120, through the switch 108. The client devices 110I-J may communicate with the switch 108 over a wired connection 112. In the illustrated example, the switch 108 communicates with the controller 104 over a wired connection 112, though, in other examples, this connection may be wireless.

Routers 106A-C may be included as another example of a point of access to the network established in primary site 102 for client devices 110A-H. Router 106A-C herein may be a combination of hardware, software, and/or firmware that may be configured to provide wireless network connectivity to wireless client devices 110A-H. In the illustrated example, routers 106A-C may be managed and configured by the controller 104. In some examples, routers 106A-C may communicate with the controller 104 and the network over (wired) connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. The remote site 132 may include a node 134 for communicating with the network 120. A node 134 may be a router, a gateway device, a digital-to-analog modem, a cable modem, a Digital Subscriber Line (DSL) modem, or some other network device configured to communicate to the network 120. The remote site 132 may also include a switch 138 and/or AP 136 in communication with the node 134 over either wired or wireless connections. The switch 138 and AP 136 provide connectivity to the network for various client devices 140A-D.

In various examples, the remote site 132 may be in direct communication with primary site 102, such that client devices 140A-D at the remote site 132 access the network resources at the primary site 102 as if these client devices 140A-D were located at the primary site 102. In such examples, the remote site 132 may be managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various examples, the network configuration 100 may include one or more smaller remote sites 142, comprising only a node 144 for communicating with the network 120 and a wireless AP 146, by which various client devices 150A-B access the network 120. Such a remote site 142 may represent, for example, an individual employee's home or a temporary remote office. The remote site 142 may also be in communication with the primary site 102, such that the client devices 150A-B at remote site 142 access network resources at the primary site 102 as if these client devices 150A-B were located at the primary site 102. The remote site 142 may be managed by the controller 104 at the primary site 102 to make this transparency possible. Once connected to the primary site 102, the remote site 142 may function as a part of a private network provided by the primary site 102. In some examples, site(s) 102, 132, 142 may function as a network area or an autonomous system. Nodes from the site may communicate with nodes of another site using Exterior Gateway Protocols (EGPs). Border Gateway Protocol (BGP) may be one example of the EGP.

The network 120 may be a public or private network, such as the Internet, or other communication networks to allow connectivity among the various sites 102, 130 to 142 as well as access to servers 160A-B. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which may be not directly part of the network configuration 100 but that facilitate communication between the various parts of the network configuration 100, and between the network configuration 100 and other network-connected entities. The network 120 may include various content servers 160A-B. Content servers 160A-B may include various providers of multimedia downloadable and/or streaming content, including audio, video, graphical, and/or text content, or any combination thereof. Examples of content servers 160A-B include, for example, web servers, streaming radio and video providers, and cable and satellite television providers. The client devices 110A-J, 140A-D, 150A-B may request and access the multimedia content provided by the content servers 160A-B.

Although only ten client devices 110A-J may be illustrated at primary site 102 in the example of FIG. 1, in various applications, a network may include dramatically larger quantities of client devices. For example, various networks may include hundreds, thousands, or even tens of thousands of client devices communicating with their respective APs, potentially at the same time. Further, device telemetry information associated with the networks may be collected at a reduced, for example when a deviation being observed. In some examples, the nodes, networks, and their relationships may be modeled in a graph database based on the telemetry information. By modeling the networks and their relationships in a graph database, the telemetry information may be used to manage configurations (e.g., routing configurations) for the networks. The telemetry information may also be used to analyze data traffic and user behavior on the networks. The telemetry information may also be used to analyze impact of disruptions in the networks. Further, by modeling the networks and their relationships in a graph database based on the telemetry information, the telemetry information may be used for security purposes. The telemetry information may be used for detecting unauthorized intrusions on the networks and for hardening the networks against unauthorized intrusions. As additional network resources may be added to the networks, the telemetry information may be used to efficiently plan where to deploy the additional network resources. It should be understood that many advantages may be possible, as further elaborated below.

In some examples, one or more nodes 160A-C forms an adjacency with neighbor nodes. In one example, nodes 160A-C may use OSPF protocol to form adjacencies. During forming of adjacency or after forming adjacency various events may occur. Nodes 160A-C may be configured to record and maintain adjacency statistics for one or more neighbor based on the occurrence of node events. The adjacency statistics may form part of event statistics, as forming adjacency may be considered as one or more events. Device telemetry constitutes recording of node events, generating event statistics (e.g., adjacency statistics), and sending refined error information, as per one example.

In some examples, adjacency statistics may include data related to protocol handshakes, database advertisements, and packet types. For example, OSPF may use Link-State Information (LSI) and Link-State Advertisements (LSAs), which may be considered as events. Information corresponding to LSI and LSAs may be exchanged between the nodes. Nodes 160A-C may contain an identical link-state database that may include information related to reachable neighbor nodes. Nodes 160A-C may create baseline information for one or more events associated with the IGP protocol for one or more neighbor. Nodes may maintain a neighbor table with whom routing information may be exchanged. A topology table containing information on available OSPF nodes may be maintained by the router. By device telemetry at node level, various events may be recorded for a neighbor, finite state transition (FST) for a protocol, system resource utilization by nodes for various events, etc. The event statistics such as adjacency statistics, FST statistics, and/or system resource utilization statistics may be sent to a central service, such as a central control device or cloud computing environment, for performing one or more control operations. For example, the control operation may include pushing a static route for optimizing/improving network performance. In another example, the device telemetry may be used to address and alter any changes with reference to interconnections, etc. In some examples, network information may be stored locally at nodes or central service for effective network management.

Other features and advantages of the present subject matter may be elaborated through the following examples.

Figure 2:
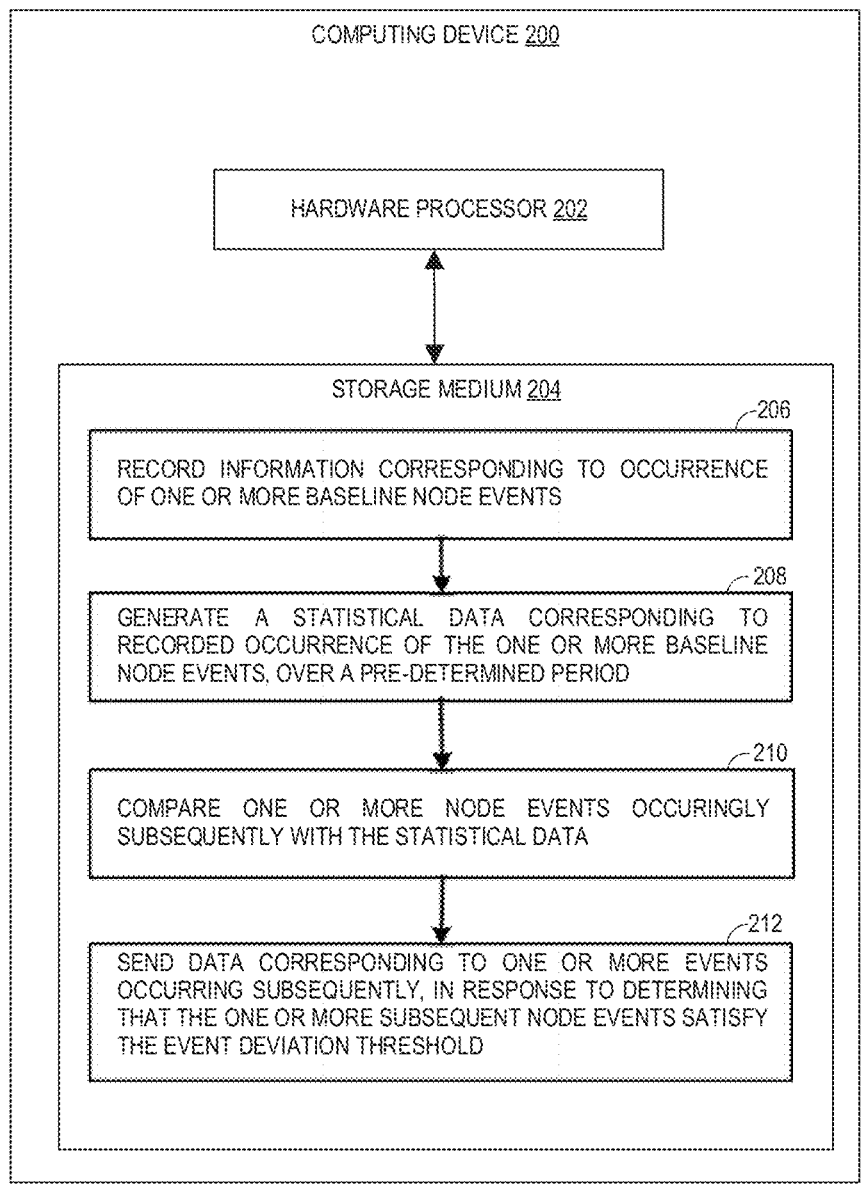
FIG. 2 illustrates a block diagram of an example computing device, in accordance with the present subject matter.

FIG. 2 may be a block diagram of an example computing device 200 capable of device telemetry, in accordance with the present subject matter. The computing device 200 may be, for example, a server computer, a controller, a router, a node, a gateway device, or any other similar computing device capable of processing data. The computing device 200 may include a hardware processor 202, and machine-readable storage medium 204.

Hardware processor 202 may be one or more central processing units (CPUs), semiconductor-based microprocessors, and/or other hardware devices suitable for retrieval and execution of instructions stored in a machine-readable storage medium 204. Hardware processor 202 may fetch, decode, and execute instructions, such as instructions 206-212, to control processes or operations for analyzing device telemetry based on graph analytics. As an alternative or in addition to retrieving and executing instructions, hardware processor 202 may include one or more electronic circuits that include electronic components for performing the functionality of one or more instructions, such as a field-programmable gate array (FPGA), application-specific integrated circuit (ASIC), or other electronic circuits. Instructions 206-212 may allow for analyzing device telemetry based on graph analytics. Although instructions 206-212 may be shown, it may be understood that the instructions may be performed in any order, with some selected set of the instructions shown, and/or with the inclusion of additional instructions, and the instructions would still fall within the scope of the disclosure.

A machine-readable storage medium 204 may include any electronic, magnetic, optical, or other physical storage devices that contain or store executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-212, for generating one or more MBSSIDs for groups of VAPs.

Hardware processor 202 may execute instruction 206 to record information corresponding to occurrence of one or more baseline node events, occurring at node level (e.g., with reference to neighbor nodes, protocols, resources, etc.). In one example, the node events may relate to forming/establishing adjacency, exchanging LSAs, etc. Further, with reference to forming adjacency (i.e., adjacency events), the node may record events with reference to frequency of forming adjacency (i.e., sending of Hello packets), time taken for forming adjacency, etc.

Hardware processor 202 may execute instruction 208 to generate, by a node, statistical data corresponding to the recorded occurrence of the one or more node events over a pre-determined period. The statistical data may include baseline information for one or more node events. For example, the pre-determined period may be 24 hours, one week, etc., which may be based on a category of node event. In some examples, a pre-determined period may be independently set for one or more node events. In further examples, the event statistics may include a minimum uptime, a maximum uptime, and a mean/baseline/average uptime and downtimes of a neighbor node.

Hardware processor 202 may execute instruction 210 to compare one or more subsequent node events with the event statistics. For example, hello and dead timers may be two exemplary events in OSPF protocol. The hello and dead timers may be 10 and 40 seconds respectively, which may be their default setting. Historically, based on the events statistics over a pre-determined period, a neighbor node would have pinged at the default setting. During one or more subsequent node events, one of the nodes may be aggressively pinging at a shorter duration, say 1 and 4 seconds, which may be due to certain errors.

Hardware processor 202 may execute instruction 212 to send data corresponding to one or more events exhibiting deviation, in response to determining deviation of the one or more node events from the statistical data. In one example, the statistical data may include an event deviation threshold. Based on the one or more node events satisfying the event deviation threshold, a deviant behavior may be identified. As per the aforementioned, example, a neighbor node with aggressive adjacency forming behavior may be notified to the central control device for identification of any failures or potential failures with the node. For example, the central control device may perform debugging operation, delink the node from network paths, alert network admittatur, etc. In further examples, the event deviation threshold may be a function of mean value of a node event (which may vary based on a category of node event).

In further examples, the hardware processor 202 may execute instructions to receive at a local control node or a central control device, the device telemetry from the network entities of the network, when a deviation may be logged. This may reduce the frequency of transfer of information or event logging with the central control device. The hardware processor 202 may execute instructions to generate a graph representative of a network state of the network based on the network entities and the telemetry data. The network entities may be graph nodes in the graph and edges between the graph nodes may represent a relation between the network entities based on the telemetry data.

Further, in some examples, the hardware processor 202 may execute instructions to determine a routing scheme for the network based on the graph. The hardware processor 202 may execute instructions to generate network configurations for the network entities based on the routing scheme. Further, hardware processor 202 may execute instructions to provide the routing scheme to the network entities. Communication between the network entities of the network may be based on the network configurations.

Figure 3A:
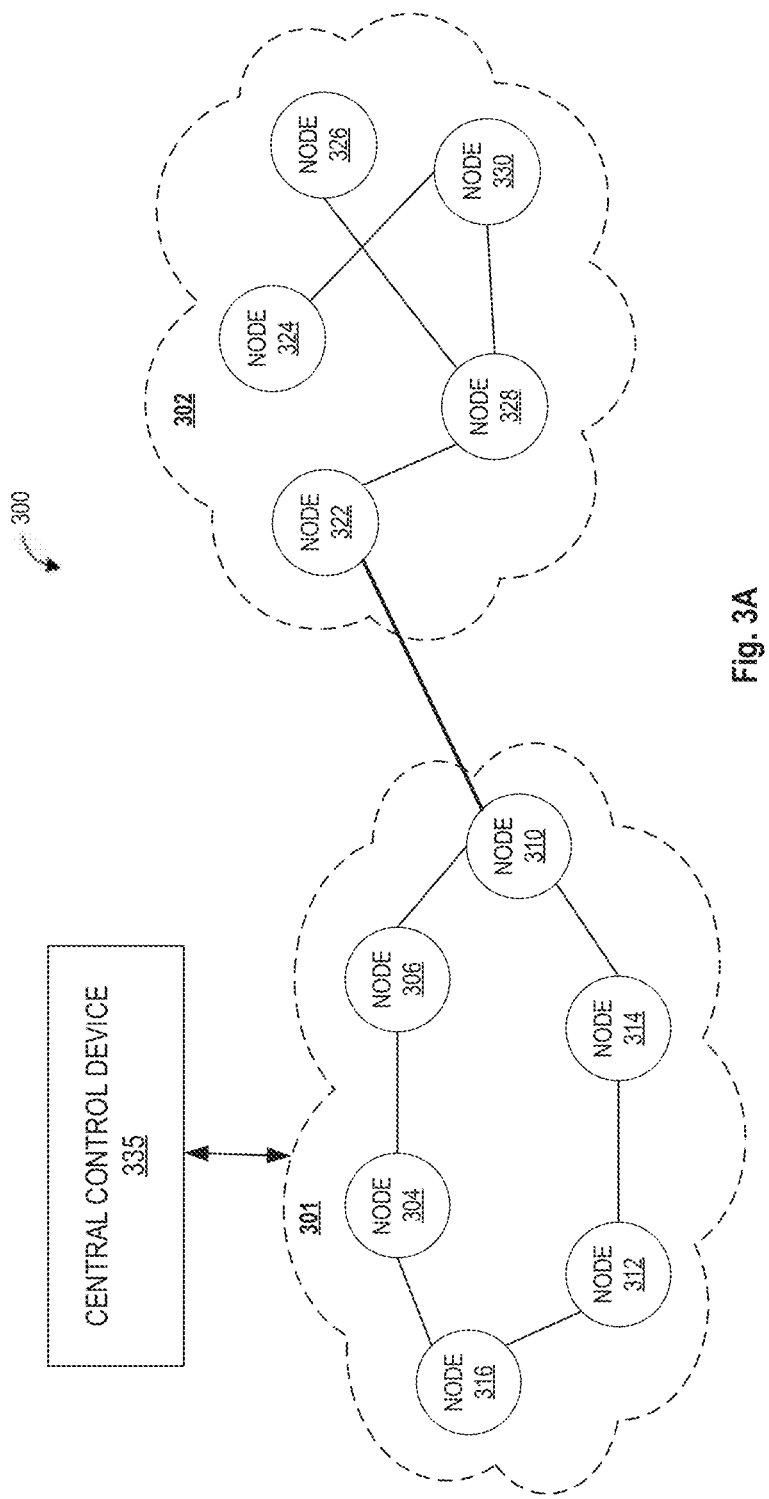
FIG. 3A illustrates a schematic view of an example network configuration, in accordance with the present subject matter.

FIG. 3A illustrates an example network configuration, in accordance with the present subject matter. The network configuration 300 comprises a set of nodes disposed/organized in two areas or organizations 301, 302. Area 301, 302 comprises a plurality of routers and may be administered by a central control device 335. The central control device 335 may be a cloud computing environment or a local control node. In the illustrated example, the network configuration comprises two areas 301, 302. The nodes within one area 301, 302 communicate with each other using interior gateway protocol (IGP). Whereas, the nodes when communicating across areas may use exterior gateway protocol (EGP). In either of the instances, the node records the occurrence of various node events and may be configured to provide device telemetry to the central control device 335.

Area 301 comprises six nodes 304-316. In some examples, node may be a router or a gateway device. Nodes 304-316 may be configured to record various node events. The node events may correspond to a neighbor adjacency, finite state transition events corresponding to protocol, or resource statistics corresponding to system resource utilization by a node. In one example, the system resource may correspond to a switch. The nodes 304-316 may form adjacency with their neighbor nodes. Similarly, area 302 comprises five nodes 322-330. Nodes 322-330 communicate with neighbor nodes through IGP. Further, nodes 310, 322 use Exterior Gateway Protocol (EGP), which may be used for communicating between organizations/areas. For example, node 310 belongs to one organization/area/network configuration 301, and node 322 belongs to a different organization/area/network configuration 302. In some examples, one or more nodes may be configured for device telemetry for various events, as per the subject matter. In the following example, device telemetry with reference to one of the nodes may be elaborated. In further examples, a set of nodes in a network configuration may be capable of device telemetry. In other examples, a set of anchor nodes may be capable of device telemetry. In yet another example, all nodes in a network may be configuration may be capable of device telemetry.

FIG. 3B illustrates a schematic view of example event statistics, in accordance with the present subject matter. The illustrated example depicts event statistics for the node 310. Reference may be made to features of FIG. 3A for explanation of certain features. In the example illustrated in FIG. 3A, the node 310 has two neighbor nodes i.e., nodes 306, 314. The node 310 forms adjacency with these neighbor nodes using IGP such as an OSPF protocol and EGP such as BGP, as per some examples and not by way of limitation.

In some examples, node 310 records every baseline node event occurring over a pre-determined period. Based on the recorded occurrence of various baseline node events (corresponding to nodes 306, 314), node 310 may generate event statistics. For example, the event statistics may include adjacency statistics such as uptime, downtime, etc. formed with the neighbor (i.e., node 306). Further, when any node event exhibits any deviation, then the node 310 may log an error event. In further examples, based on adjacency statistics, node 310 may determine any event deviation by comparing it with historical data (i.e., adjacency statistics). For example, event deviation may indicate that neighbor node 306 may be breaking adjacency. The router may alert the administrative device, such as the central control device, for debugging or path modification. In some examples, a deviation of an event may be determined based on an event deviation threshold (e.g., event deviation threshold may be two times of mean node event). In further, the event deviation threshold may be in the range of 1.5 to 3 times the mean value. Node 310 may record and store event statistics 340 in a table as illustrated in FIG. 3B. The event statistics 340 may comprise information corresponding to a node and/or a protocol, as per some examples. The illustrated example table has event statistics corresponding to its neighbor nodes 306, 314, and 322. Further examples of adjacency events may be recorded in adjacency statistics 341, as shown in FIG. 3B.

In a further example, neighbor node 306 may advertise neighbor IP addresses. For example, during various instances, the neighbor node 306 may share/advertise 'x' number of addresses. Based on the recorded historical event data, the event statistics may be generated by node 310. However, during a later instance, the number of IP addresses may come down to 'y', which may be less than 'x'. Node 306 may compare the event data with event statistics to determine if the node event crosses an event deviation threshold. For example, the reduction in addresses may be due to a change in network configuration, implementation of a summarized or group protocol, or network issue further down the path. In such instances, node 310 may log an event error and communicate the event error to the central control device 335. In some examples, the central control device 335 may compare this device telemetry with device telemetry of one or more nodes in the network/organization to determine or revise baseline information. In some examples, a node may be provided with Unsupervised ML to detect and log specific anomalies in the network In a further example, nodes 304-316 may be OSPF neighbor nodes in a network 301. The nodes 304-316 may be communicatively coupled to a single network entity, such as a switch. The nodes 304-316 may share system resources (e.g., Processing/Memory/Tx/Rx queues, etc.). With such a configuration, a node may exhibit events around a mean value. However, when any node exhibits a mean, which shows deviation from the mean of other nodes, then an error event may be logged. In some examples, that particular node may be experiencing some fault.

In some examples, forming adjacency may be a common design paradigm across various levels of protocols. Further, node 310 may communicate with neighbor nodes in other organizations/networks/areas, using Exterior Gateway Protocol such as BGP. Using BGP, nodes 310, 322 may exchange information of routes. Finite-state transition (FST) statistics may be generated from various BGP transition states. For example, BGP may use the Finite State Machine (FSM) to maintain a table of all BGP peers and their operational status. The BGP session may include events such as idle, connect, active, established, etc. Events corresponding to FSM and transition between states (i.e., FST according to protocol) may be also recorded over a pre-determined period by nodes 310, 322. FIG. 3B illustrates FST statistics 342 that may be recorded and generated by node 310.

Form various FST events may include, during idle state, node 310 may perform a start event and tries to initiate a connection with neighbor node 322. The initiating node 310 may wait for a new connection from the neighbor node 322. In case of any error event, such error events may be recorded to generate FST statistics 342. Further, in instances of successful initiation, BGP may transition to connect stage. At the connect stage, the initiating node 310 may initiate another TCP connection. Node 310 may manage to establish a connection with the neighbor node 322, based on various transition states (for ease, only a few transition states are discussed and not by way of limitation). Various FST statistics may be recorded and generated to identify and deviation. In case of determining any event deviation, the central control device may determine an alternate path between the networks or plan paths for upcoming events. Whereas, in some other examples, a different Ego may be used that comprises different state transitions.

Further, event statistics may include information with reference to network chum, a ratio of system resource utilization, such as processor and memory consumption statistics. Based on internal or external chum, the network may be monitored. The central control device may receive these event statistics and may recommend a higher configuration of resources, or different routing schemes can be proposed. In some other examples, event statistics may correspond to quantitative recording of flow data to examine real-time traffic. Further, a node may be configured to perform device telemetry and at a frequency that does not affect network traffic.

Based on the device telemetry, the central control device may orchestrate configuration of nodes/switches for optimum network operation. The node proactively logs any errors and communicates the same to the central control device. For example, device telemetry may relay information such as probable downtime, stability of nodes, or non-availability of a neighbor or delay in EGP protocol during an event. Based on the relayed information, the central control device may modify static route or perform path corrections. The device telemetry of the present subject matter may expedite network failure detection, fault localization, etc. For example, any path degradation may be expected based on the event statistics (i.e., historical baseline data recorded). Device telemetry may be used by the central control device to identify real-time issues, such as jitter, packet loss, etc. effectively.

Also, most of network state information may be stored in the form of a graph/graph database locally in the device. Real-time graph analytics may be built into the protocols in tandem with the cloud views and may be alerted from device, based on unexpected behaviors seen in the graph, like the average graph size, nodes, and interconnections, etc. varying dramatically. In some examples, the graph database may comprise information corresponding to one or more nodes, of the plurality of nodes. Information corresponding to a neighbor relation between two or more nodes, and a relation between a node and one or more node events. In further examples, the graph database may be updated with information based on at least one of the one or more baseline node events and the one or more subsequent node events. The node(s) may communicate information corresponding to node events or deviation of node events, to the central control device. For example, the node(s) may communicate information to the central control device based on a condition that an updated graph database satisfies a graph deviation condition. In some examples, the graph database may be represented by graph nodes and graph edges. The graph nodes may represent nodes, node events, neighbor nodes, switches, network configuration, protocols, etc. The graph edges connect graph nodes to define relation therebetween. The graph deviation condition may include a change in at least one of a graph size, a number of graph nodes, a number of graph edges, etc.

Figure 4A:
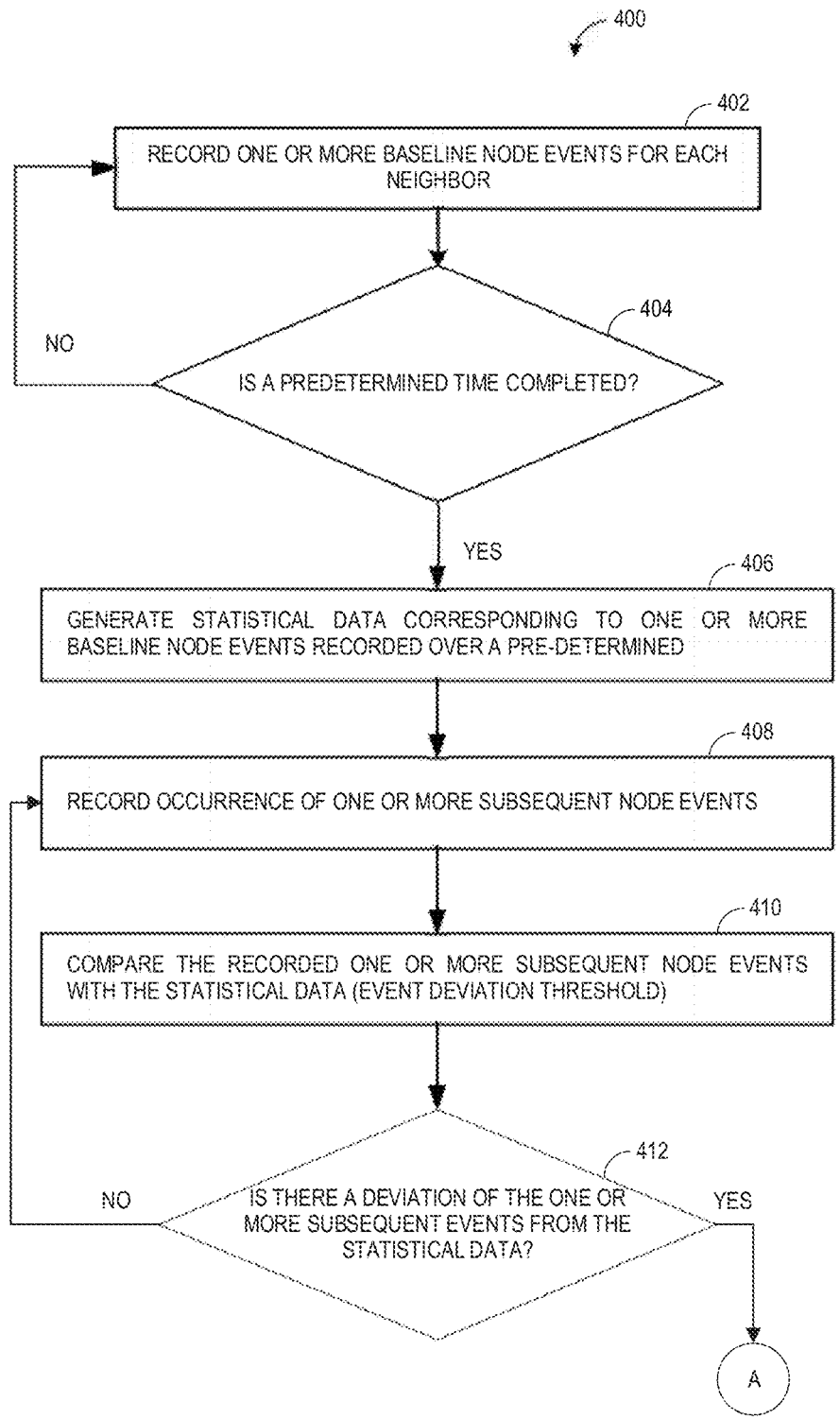
FIGS. 4A and 4B illustrate a flow diagram depicting an example method of monitoring a network, in accordance with the present subject matter.
Figure 4B:
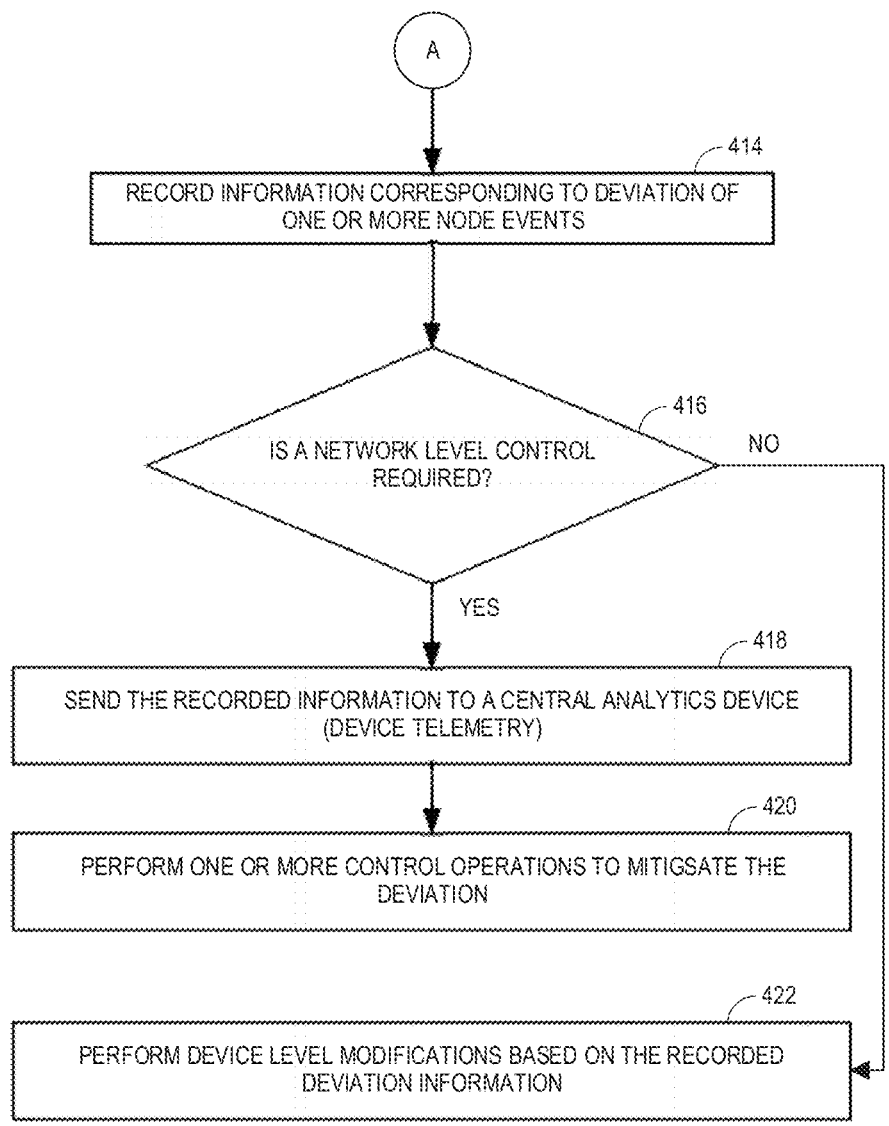

FIGS. 4A and 4B illustrate a flow diagram depicting an example method 400 of operation of device telemetry in a network, in accordance with the present subject matter. For example, method 400 may be performed by a node or a computing device that includes one or more processors and a storage medium configured with machine-readable executable instructions. The storage medium may be a non-transitory type and the processor may fetch, decode, and execute the instructions.

At 402, a node may record information corresponding to occurrence of various baseline node events for a neighbor. The node may have one or more neighbor nodes. Node events may correspond to IGP and/or EGP. The node events may correspond to forming adjacency, finite state transition, resource utilization, etc. The recorded information may be stored in a local storage device or at a storage disk disposed remotely to the node.

At 404, the node may determine if a pre-determined period may be complete. In other words, the node may record various baseline node events for the pre-determined. In some examples, certain category of node event may be provided with a separate pre-determined period. As various node events occur at different frequencies.

At 406, the node may generate statistical data (i.e., event statistics) corresponding to the recorded occurrence of one or more baseline node events over the pre-determined period. The statistical data may include baseline information for the of one or more node events. Generating statistical data may include determining a mean value for the node event and a threshold value. In some examples, a threshold value may be twice the mean value.

At 408, the node may further record various node events that occur subsequently, which are referred to as subsequent node events. For example, at 406, a baseline for various node events may be determined. The one or more subsequent node events may be gauged with reference to the statistical data generated, for identifying any deviations.

At 410, the node may compare the one or more subsequent node events with the statistical data. For example, nodes events of a current instance may be compared to the mean value or a node deviation threshold, determined for the particular node event. For example, the comparison may be with reference to the rate at which a neighbor has formed adjacency, in a current instance, with reference to earlier instances.

At 412, the node may determine whether there may be deviation of any node events from the statistical data. In one example, if a deviation may be observed, the node event may be compared to a threshold value for the particular node event. This may be used to identify an anomaly in the network, failures, or potential failures. If no deviation may be observed, then the node may return to recording node events.

Whereas, at 412, if a deviation may be observed—then, at 416, the node records the information corresponding to deviation of one or more node events. For example, the deviation data may include information to time taken, frequency, or errors with reference to forming adjacency, finite state transition corresponding to a protocol, or resource utilization for the neighbor, for a protocol, etc. In some examples, recording information corresponding to deviation may include creating event error logs.

At 416, in some examples, the node may decide whether a network-level control may be required for rectifying deviation. For example, the node may be configured to decide this based on the frequency of occurrence/recording of error logs, extent of deviation from the threshold value, etc. The node may determine that a network-level control may be required, such as altering intervals (e.g., synchronization interval) or path modification.

At 418, the node may send recorded information (e.g., deviation information, error logs, and/or statistical data) to a central service. The central service may be a control node within the network. In another example, the central service may be a central control device disposed remotely and communicatively coupled via a wired or wireless network. In a further example, the central service may be a cloud computing environment. In further examples, the node may send data corresponding to one or more subsequent node events to the central control device, at an alert frequency. The alert frequency may be less than an event occurrence frequency. The event occurrence frequency may correspond to the occurrence of one or more node events. The node communicates intelligent event data to the central control device for effective monitoring and management of network configuration.

At 420, the central service may perform one or more control operations, which may be node level or network level. For example, the central service may push a modified path for optimum network performance based on the statistical data and/or the error logs.

Whereas, at 416, the node may determine that a network-level control may not be required. Then at 422, the node may be configured to perform device level modifications to address the deviations.

Further examples of adjacency events may include, but not limited to, a time taken for forming adjacency, a frequency of adjacency formation with a neighbor node, a baseline uptime of a neighbor node, a baseline downtime of neighbor node, an average uptime of a neighbor node, an average downtime of a neighbor node, a packet drop time, or a number of neighbor addresses advertised by a neighbor node. After forming adjacency, the baseline uptime of a neighbor may determine average time for which a neighbor may be available (keepalive). In some examples, adjacency may come up very soon when exchanging information between two nodes. Such node events may be compared with event statistics, to identify any deviation. For instance, current adjacency being different from previously known behavior, from the adjacency statistics. The deviation may include fast or slow formation of adjacency. If the adjacency may be fast in an instance, with a deviation going out of the threshold, then the node may identify that some information might be lost. This may require some routers prefixes or causing a change in a static path by altering the central control device.

Figure 5:
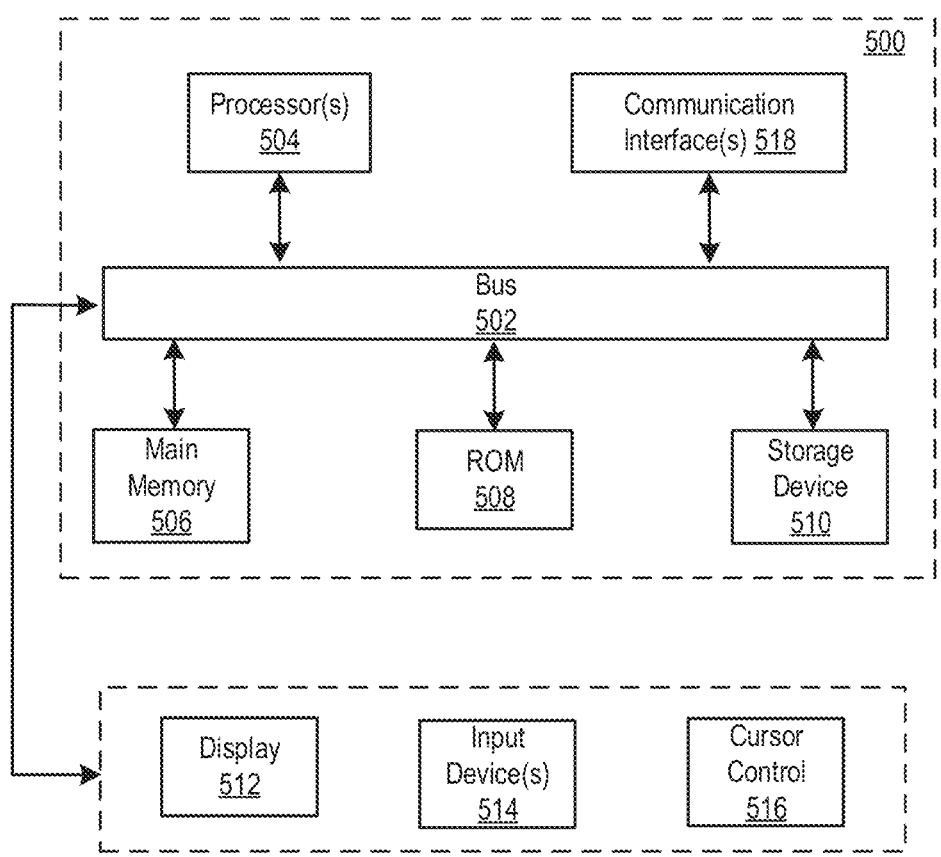
FIG. 5 illustrates an example computing device that may be used to implement various features of examples described in the present disclosure.

FIG. 5 depicts a block diagram of an example computing device 500 in which various of the examples described herein may be implemented. The computing device 500 may include a bus 502 or other communication mechanisms for communicating information, one or more hardware processors 504 coupled with bus 502 for processing information. Hardware processor(s) 504 may be, for example, one or more general-purpose microprocessors.

The computing device 500 also may include a main memory 506, such as random-access memory (RAM), cache, and/or other dynamic storage devices, coupled to bus 502 for storing information and instructions to be executed by processor 504. Main memory 506 also may be used for storing temporary variables or other intermediate information during the execution of instructions to be executed by processor 504. Such instructions, when stored in storage media accessible to processor 504, render computing device 500 into a special-purpose machine that may be customized to perform the operations specified in the instructions.

The computing device 500 further may include a read-only memory (ROM) 508 or other static storage device coupled to bus 502 for storing static information and instructions for processor 504. A storage device 510, such as a magnetic disk, optical disk, or USB thumb drive (Flash drive), etc., may be provided and coupled to bus 502 for storing information and instructions.

The computing device 500 may be coupled via bus 502 to a display 512, such as a liquid crystal display (LCD) (or touch screen), for displaying information to a computer user. An input device 514, including alphanumeric and other keys, may be coupled to bus 502 for communicating information and command selections to processor 504. Another type of user input device may be cursor control 516, such as a mouse, a trackball, or cursor direction keys for communicating direction information and command selections to processor 504 and for controlling cursor movement on display 512. In some examples, the same direction information and command selections as cursor control may be implemented via receiving touches on a touch screen without a cursor.

The computing device 500 may include a user interface module to implement a GUI that may be stored in a mass storage device as executable software codes that may be executed by the computing device(s). This and other modules may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, may refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer-readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computing device 500 may implement the techniques described herein using customized hard-wired logic, one or more ASICs or FPGAs, firmware, and/or program logic which in combination with the computing device causes or programs computing device 500 to be a special-purpose machine. According to one example, the techniques herein may be performed by computing device 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that stores data and/or instructions that cause a machine to operate in a specific fashion. Such non-transitory media may comprise non-volatile media and/or volatile media. Non-volatile media may include, for example, optical or magnetic disks, such as storage device 510. Volatile media may include dynamic memory, such as main memory 506. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge, and networked versions of the same.

Non-transitory media may be distinct from but may be used in conjunction with transmission media. Transmission media participates in transferring information between non-transitory media. For example, transmission media may include coaxial cables, copper wire, and fiber optics, including the wires that comprise bus 502. Transmission media may also take the form of acoustic or light waves, such as those generated during radio-wave and infra-red data communications.

The computing device 500 also may include a communication interface 518 coupled to bus 502. Communication interface 518 provides a two-way data communication coupling to one or more network links that may be connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 may send and may receive electrical, electromagnetic, or optical signals that carry digital data streams representing various types of information.

A network link typically provides data communication through one or more networks to other data devices. For example, a network link may provide a connection through a local network to a host computer or data equipment operated by an Internet Service Provider (ISP). The ISP in turn provides data communication services through the worldwide packet data communication network now commonly referred to as the "Internet." Local networks and Internet both use electrical, electromagnetic, or optical signals that carry digital data streams. The signals through the various networks and the signals on the network link and through communication interface 518, which carry the digital data to and from computing device 500, may be example forms of transmission media.

The computing device 500 may send messages and receive data, including program code, through the network (s), network link and communication interface 518. In the Internet example, a server might transmit a requested code for an application program through the Internet, the ISP, the local network, and the communication interface 518. The received code may be executed by processor 504 as it may be received, and/or stored in storage device 510, or other non-volatile storage for later execution.

The processes, methods, and algorithms described in the preceding sections may be embodied in, and fully or partially automated by, code components executed by one or more computing devices or computer processors comprising computer hardware. The one or more computing devices or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations may be intended to fall within the scope of this disclosure, and certain method or process blocks may be omitted in some implementations. The methods and processes described herein may be also not limited to any particular sequence, and the blocks or states relating thereto may be performed in other sequences that may be appropriate, or may be performed in parallel, or in some other manner. Blocks or states may be added to or removed from the disclosed examples. The performance of certain operations or processes may be distributed among computing devices or computer processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines, or other mechanisms might be implemented to make up a circuit. In implementation, the various circuits described herein might be implemented as discrete circuits or the functions and features described may be shared in part or in total among one or more circuits. Even though various features or elements of functionality may be individually described as separate circuits, these features and functionality may be shared among one or more common circuits, and such description shall not require or imply that separate circuits may be required to implement such features or functionality. Where a circuit may be implemented in whole or in part using software, such software may be implemented to operate with a computing or processing system capable of carrying out the functionality described with respect thereto, such as computing device 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, may be generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case may be intended or required in instances where such broadening phrases may be absent.

I claim:

1. A method comprising:
    recording, by a node out of a plurality of nodes, occurrence of one or more baseline node events, wherein at least one of the one or more baseline node events corresponds to forming adjacency, wherein the plurality of nodes are disposed in a network configuration, and the network configuration is communicatively coupled to a central control device;
    generating, by the node, a statistical data corresponding to a recorded occurrence of the one or more baseline node events, over a pre-determined period;
    comparing, by the node, one or more subsequent node events, with the statistical data, wherein the statistical data includes an event deviation threshold; and communicating, by the node, data corresponding to the one or more subsequent node events to the central control device, in response to determining that the one or more subsequent node events, satisfy the event deviation threshold.

2. The method of claim 1, wherein comparing, by the node, the one or more subsequent node events, with the statistical data includes:
determining, by the node, event deviation of the one or more subsequent node events.

3. The method of claim 1, wherein the event deviation threshold is a function of a mean value of a node event, and the event deviation threshold is 1.5 to 3 times of the mean value.

4. The method of claim 1, wherein the one or more baseline node events include at least one of an adjacency event corresponding to a neighbor node, a finite state transition event corresponding to a protocol, or a resource statistic corresponding to system resource utilization by a node.

5. The method of claim 4, wherein the adjacency event includes at least one of a time taken for forming adjacency, a frequency of adjacency formation with a neighbor node, a baseline uptime of a neighbor node, a baseline downtime of neighbor node, an average uptime of a neighbor node, an average downtime of a neighbor node, a packet drop time, or a number of neighbor addresses advertised by a neighbor node.

6. The method of claim 4, wherein the finite state transition event includes exterior gateway protocol states for forming adjacency with a neighbor node, wherein the neighbor node is part of a different network configuration.

7. The method of claim 1, further comprising:
storing, by at least one of the node or the central control device, information corresponding to the network configuration in a graph database, wherein:
the graph database comprises information corresponding to at least one of the plurality of nodes, a neighbor relation between two or more nodes, a relation between a node and one or more node events.

8. The method of claim 7, further comprising:
updating, by the node, the graph database based at least one of the one or more baseline node events and the one or more subsequent node events; and
communicating, by the node, to the central control device based on an updated graph database satisfying a graph deviation condition.

9. The method of claim 8, wherein the graph deviation condition includes a change in at least one of a graph size, a number of graph nodes, or a number of graph edges.

10. The method of claim 1, further comprising:
sending, by the node, the statistical data corresponding to one or more subsequent node events, to the central control device;
analyzing, by the central control device, data corresponding to the one or more subsequent node events and the statistical data; and
performing, by the central control device, one or more control operations on the network configuration.

11. The method of claim 10, wherein the one or more control operations include at least one of a debugging of node, a path modification between one or more nodes from the network configuration, or pushing a static route to the plurality of nodes.

12. The method of claim 1, wherein sending, by the node, data corresponding to the one or more subsequent node events, including:
creating, by the node, event error logs corresponding to the one or more subsequent node events; and
sending, by the node, the event error logs corresponding to the one or more subsequent node events to the central control device.

13. The method of claim 1, wherein the central control device is a control node, and the control node is part of the network configuration.

14. The method of claim 1, wherein the central control device is a cloud-computing environment.

15. A node comprising:
one or more processors; and
a storage medium storing instructions executable by the one or more processors to cause the one or more processors to:
record occurrence of one or more baseline node events in a network configuration, wherein at least one of the one or more baseline node events corresponds to forming adjacency, and wherein the network configuration includes a central control device;
generate a statistical data corresponding to a recorded occurrence of the one or more baseline node events, over a pre-determined period;
compare one or more subsequent node events, with the statistical data, wherein the statistical data includes an event deviation threshold; and
communicate data corresponding to the one or more subsequent node events to the central control device, in response to determining that the one or more subsequent node events, satisfy the event deviation threshold.

16. The node of claim 15, wherein communication of data corresponding to the one or more subsequent node events to the central control device, include the one or more processors to:
communicate data corresponding to the one or more subsequent node events to the central control device, at an alert frequency, wherein the alert frequency is less than an event occurrence frequency corresponding to occurrence of the one or more subsequent node events.

17. The node of claim 15, wherein the one or more baseline node events and the one or more subsequent node events correspond to at least one of an interior gateway protocol between nodes, an exterior gateway protocol between nodes, or a system resource utilization by a node.

18. A non-transitory storage medium comprising instructions, the instructions executable by one or more processors of a node to:
record occurrence of one or more baseline node events in a network configuration, wherein at least one of the one or more baseline node events corresponds to forming adjacency, and wherein the network configuration includes a central control device;
generate a statistical data corresponding to a recorded occurrence of the one or more baseline node events, over a pre-determined period;
compare one or more subsequent node events, with the statistical data, wherein the statistical data includes an event deviation threshold; and
communicate data corresponding to the one or more subsequent node events to the central control device, in response to determining that the one or more subsequent node events, satisfy the event deviation threshold.

19. The non-transitory storage medium of claim 18, wherein one or more baseline node events correspond to one or more category of node events, and wherein one or more category of node events are defined with separate predetermined time periods.

20. The non-transitory storage medium of claim 18, wherein the network configuration includes a plurality of nodes, and the plurality of nodes correspond to one or more network organizations.

* * * * *